(12) United States Patent
Daniel

(10) Patent No.: US 9,268,919 B1
(45) Date of Patent: Feb. 23, 2016

(54) SYSTEM AND METHOD FOR STORING AND DISTRIBUTING MEDIA CONTENT

(76) Inventor: Isaac S. Daniel, Miramar, FL (US)

( * ) Notice: Subject to any disclaimer, the term of this patent is extended or adjusted under 35 U.S.C. 154(b) by 161 days.

(21) Appl. No.: 13/352,263

(22) Filed: Jan. 17, 2012

Related U.S. Application Data

(60) Provisional application No. 61/433,421, filed on Jan. 17, 2011.

(51) Int. Cl.
*G06F 21/10* (2013.01)
*G06F 21/31* (2013.01)
*G06Q 30/06* (2012.01)

(52) U.S. Cl.
CPC .................................... *G06F 21/10* (2013.01)

(58) Field of Classification Search
USPC ...................................................... 726/27, 28
See application file for complete search history.

(56) References Cited

U.S. PATENT DOCUMENTS

| | | | |
|---|---|---|---|
| 7,073,189 B2* | 7/2006 | McElhatten et al. | 725/58 |
| 2003/0131247 A1* | 7/2003 | Cannon | 713/186 |
| 2010/0083321 A1* | 4/2010 | Schreiber | 725/87 |
| 2011/0162086 A1* | 6/2011 | Rogel et al. | 726/28 |

* cited by examiner

*Primary Examiner* — Beemnet Dada
(74) *Attorney, Agent, or Firm* — Alberto Interian, III, Esq.

(57) ABSTRACT

A system comprising a commerce module to offer a copy of a piece of media content for sale, a server module to immediately provide access to a digital copy of the piece of media content, a reservation module to reserve a hard copy of the piece of media content, and a delivery module to deliver the hard copy of the piece of media content. A method comprising offering a digital copy of a piece of media content for sale, reserving a hard copy of the piece of media content when a digital copy of the piece of media content is sold, allowing at least one user to order the hard copy after having purchased the digital copy, and denying access to the digital copy when the hard copy has been ordered.

17 Claims, 3 Drawing Sheets

SYSTEM AND METHOD FOR STORING AND DISTRIBUTING MEDIA CONTENT

PRIORITY CLAIM

The present application is a non-provisional utility patent application that is based on and claims priority to U.S. provisional patent application Ser. No. 61/433,421, filed on Jan. 17$^{th}$, 2011, titled "System and Method for Distributing Content," by Isaac S. Daniel, which is hereby incorporated by reference in its entirety as if fully stated herein.

FIELD

The present disclosure relates generally to electronic systems and distribution systems, and more particularly, to systems, methods, and various other disclosures related to distributing and storing media content.

BACKGROUND

Traditionally, consumers have purchased media content, such as movies, in hard copies. Various hard copies have existed throughout time, such as video tapes, film reels, CD discs, DVD discs, and now Blu-Ray discs. Unfortunately, such traditional means of delivering media content to consumers has also plagued consumers with clutter and mess in their media viewing areas, which has caused many consumers to simply cease purchasing media content once their collections have grown too big.

In an effort to solve this problem, media is offered for consumption in digital form, whereby consumers may stream or download media content instead of purchasing a hard copy. Many consumers remain unsatisfied however, as digital copies do not offer a tangible item associated with the media content for consumers to own, such as a DVD or Blu-Ray discs along with associated artwork and paperwork, which are highly valued by media collectors and connoisseurs.

SUMMARY

Accordingly, the various embodiments of systems and methods disclosed herein result from the realization that content delivery can be made more convenient and less cluttered, while satisfying consumer desire to have a tangible item associated with the media content, by providing a method wherein users are offered a digital copy of the content initially, and a hard copy is reserved for distribution at a later time.

DETAILED DESCRIPTION OF PREFERRED EMBODIMENTS

Figure 1:
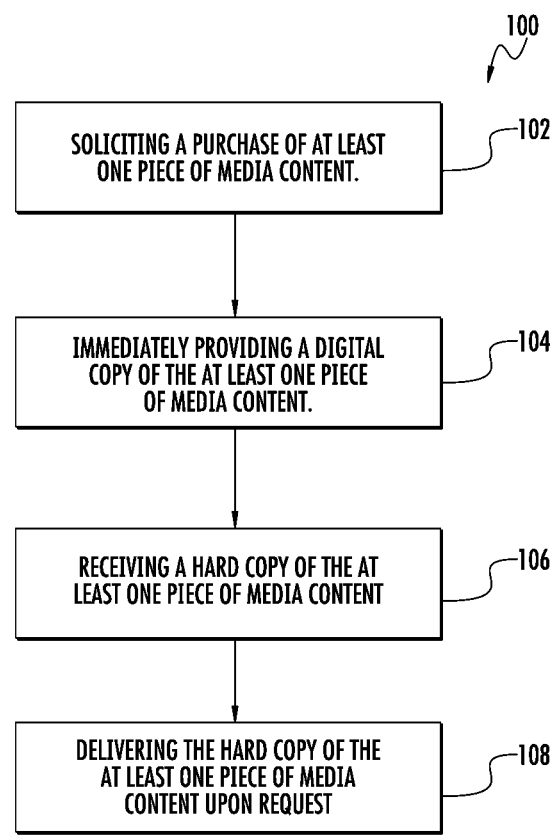
FIG. 1 shows a block diagram depicting a method in accordance with one embodiment.

FIG. 1 shows a block diagram depicting a method 100 for distributing media, comprising using at least one processor to perform any or all of the following: soliciting a purchase of at least one piece of media content (block 102); immediately providing a digital copy of the at least one piece of media content (104); reserving a hard copy of the at least one piece of media content (106); and delivering the hard copy of the at least one piece of media content upon request (108).

In some embodiments, the at least one processor may be any type of computer processor and may be located at any location, such as a server. The processor may be part of an online media content store server, or digital rights management server used to deliver digital content to users.

In one embodiment, soliciting a purchase of at least one piece of media content comprises soliciting a purchase of at least one piece of media content over a computer network, such as a closed computer network or an open computer network, such as the internet. The purchase may be solicited via computing hardware, such as a personal computer, a laptop, a mobile computing device, embedded television hardware, or a set top box. In an alternate embodiment, the purchase may be a temporary purchase, such as a rental, or a permanent purchase such as an ownership purchase.

In one embodiment, the at least one piece of media content may be any kind of media content, including, but not limited to, music, a movie, a television show, a documentary, and a television broadcast.

In some embodiments, immediately providing a digital copy of the at least one piece of media content comprises providing a download of the at least one piece of media content. The at least one digital copy may be any type of digital copy in any type of file format, including, but not limited to, .MP4, .MP3 .MPEG, .AVI, and the like. In a further embodiment, the digital copy of the media content may be any type of quality or resolution, such as, but not limited to, 128 kbs, 256 kbs, 480i, 480p, 720i, 720p, 1080i, 1080p, and the like. In some embodiments, immediately providing a digital copy of the at least one piece of media content comprises providing a stream or progressive download of the at least one piece of media content. In one embodiment, the digital copy may be accessed from any type of computing device, including, but not limited to, televisions, set top boxes, mobile devices, personal computers, tablet computers, laptops, and the like.

In some embodiments, the hard copy of the at least one piece of content comprises any type of hard copy, including, but not limited to a computer readable medium, such as a CD, a DVD, a Blu-Ray disc, solid state memory, and the like. In one embodiment, reserving a hard copy comprises of storing a hard copy, such as storing a hard copy in a storage or distribution facility, which may be distributed at a later point in time. In another embodiment, reserving a hard copy may comprise reserving the right to create a hard copy at a later point in time. In some embodiments, delivering the hard copy of the at least one piece of media content upon request comprises creating a hard copy of the at least one piece of media content, if not already existing, and physically delivering the hard copy of the at least one piece of media content. Physically delivering the hard copy may comprise using any mail or courier service to deliver the hard copy.

In some embodiments, the request for delivery may be made by a customer or by predetermined scheduled delivery.

In some embodiments, the method 100 may further comprise using at least one processor to deny access to the digital copy of the at least one piece of media content if the hard copy of the at least one piece of media content has been requested or delivered.

In another embodiment, the method 100 may further comprise using at least one biometric identifier to verify at least one user's identity and authorize access to the at least one piece of media content. In some embodiments, the biometric identifier may comprise of a fingerprint scanner, an iris scanner, a video sensor tied to image or facial recognition software, voice recognition software, and the like.

Figure 2:
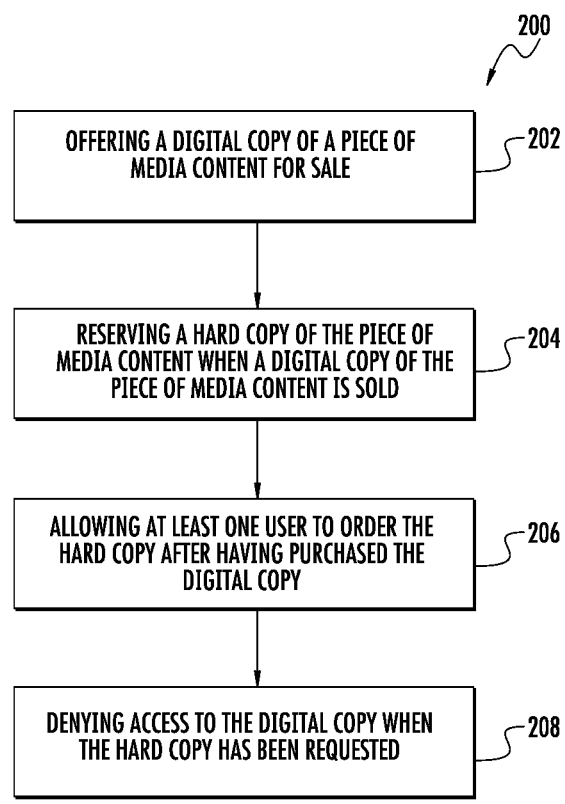
FIG. 2 shows a block diagram depicting a method in accordance with another embodiment.

Referring now to FIG. 2, a block diagram depicting a method 200 is shown in accordance with one embodiment, wherein method 200 comprises offering a digital copy of a piece of media content for sale (block 202), reserving a hard copy of the piece of media content when a digital copy of the piece of media content is sold (block 204), allowing at least one user to order the hard copy after having purchased the digital copy (block 206), and denying access to the digital copy when the hard copy has been ordered (block 208).

In some embodiments, method 200 may further comprise using at least one processor to perform any of the aforementioned steps. In some embodiments, the at least one processor may be any type of computer processor and may be located at any location, such as a server. The processor may be part of an online media content store server, or digital rights management server used to deliver digital content to users.

In one embodiment, offering a digital copy of a piece of media content for sale comprises offering a digital copy of a piece of media content for sale over a computer network, such as a closed computer network or an open computer network, such as the internet. The sale may be offered, solicited, or made via computing hardware, such as a personal computer, a laptop, a mobile computing device, embedded television hardware, or a set top box. In an alternate embodiment, the sale may be a temporary sale, such as a rental, or a permanent sale such as an ownership sale.

In one embodiment, the piece of media content may be any kind of media content, including, but not limited to, music, a movie, a television show, a documentary, and a television broadcast.

In some embodiments, offering a digital copy of the piece of media content for sale comprises providing a download of the piece of media content. The digital copy may be any type of digital copy in any type of file format, including, but not limited to, .MP4, . MP3 .MPEG, .AVI, and the like. In a further embodiment, the digital copy of the media content may be any type of quality or resolution, such as, but not limited to, 128 kbs, 256 kbs, 480i, 480p, 720i, 720p, 1080i, 1080p, and the like. In some embodiments, offering a digital copy of the piece of media content for sale comprises providing a stream or progressive download of the piece of media content. In one embodiment, the digital copy may be accessed from any type of computing device, including, but not limited to, televisions, set top boxes, mobile devices, personal computers, tablet computers, laptops, and the like.

In some embodiments, the hard copy of the at least one piece of content comprises any type of hard copy, including, but not limited to a computer readable medium, such as a CD, a DVD, a Blu-Ray disc, solid state memory, and the like. In one embodiment, reserving a hard copy comprises of storing a hard copy, such as storing a hard copy in a storage or distribution facility, which may be distributed at a later point in time. In another embodiment, reserving a hard copy may comprise reserving the right to create a hard copy at a later point in time. In some embodiments, method 200 may comprise delivering the hard copy of the at least one piece of media content upon request, wherein delivering the hard copy comprises creating a hard copy of the at least one piece of media content, if not already existing, and physically delivering the hard copy of the at least one piece of media content. Physically delivering the hard copy may comprise using any mail or courier service to deliver the hard copy.

In some embodiments, the request or order for delivery of the hard copy may be made by a user, such as a customer, or by predetermined scheduled delivery.

In some embodiments, method 200 may further comprise denying access to the digital copy of the piece of media content if the hard copy of the at least one piece of media content has been ordered, requested or delivered. This may be accomplished through the use of digital rights management systems (DRMs), or by blocking access to the digital copy of the media content stored on a server.

In another embodiment, method 200 may further comprise using at least one biometric identifier to verify at least one user's identity and authorize access to the at least one piece of media content. In some embodiments, the biometric identifier may comprise of a fingerprint scanner, an iris scanner, a video sensor tied to image or facial recognition software, voice recognition software, and the like.

Figure 3:
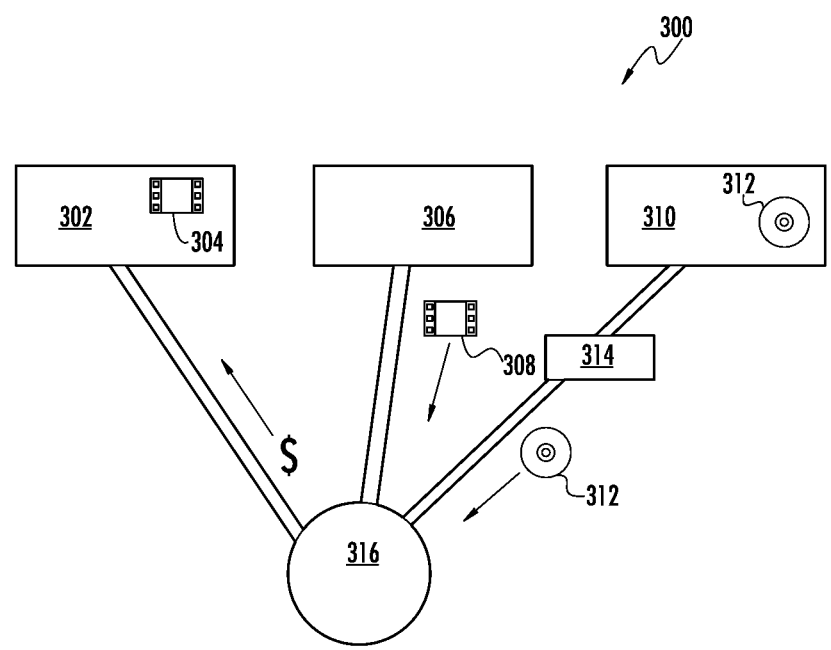
FIG. 3 system in accordance with one embodiment.

Referring now to FIG. 3, a system 300 is shown, wherein system 300 comprises at least one commerce module 302 to offer at least one copy of at least one piece of media content 304 for sale, at least one server module 306 to immediately provide access to at least one digital copy 308 of the at least one piece of media content 304, at least one reservation module 310 to reserve at least one hard copy 312 of the at least one piece of media content 304, and at least one delivery module 314 to deliver at least one hard copy 312 of the at least one piece of media content 304.

In some embodiments, the at least one piece of media content 304 comprises any type of media content, including, but not limited to, music, a movie, a television show, a documentary, a podcast, a television broadcast, and the like.

In some embodiments, the at least one commerce module 302 comprises a software based component, such as an online store, a virtual store, an electronic virtual store, and the like. In another embodiment, the at least one commerce module 302 comprises a hardware based component, such as a server to host an online or electronic virtual store. In yet another embodiment, at least one commerce module 302 comprises a combination of hardware and software based components, such as those mentioned herein. In some embodiments, a user 316 may access commerce module 302 through a device connected to a computer network, such as PC, a tablet PC, a mobile phone, a television, a set top box, and the like connected to a network, such as the internet.

In some embodiments, server module 306 may comprise a software based component, such as content delivery and management software, digital rights management, and the like. In another embodiment, server module 306 may comprise a hardware based component, such as a server computer, a router, a network node, and the like. In another embodiment server module 306 may comprise a content delivery network. In yet another embodiment, server module 306 may comprise a combination of software and hardware based components, such as those described herein. In some embodiments, user 316 may access server module 306 through a device connected to a computer network, such as PC, a tablet PC, a mobile phone, a television, a set top box, and the like connected to a network, such as the internet.

In another embodiment, at least one reservation module 310 may comprise a software based component, such as product distribution and storage software, warehouse management or storage management software, inventory management software, and the like. In another embodiment, at least one reservation module 310 may comprise a hardware based component, such as a warehouse, warehouse management computer, inventory management computer, and the like. In yet another embodiment, reservation module 310 comprises a combination of software and hardware based components, such as those described herein. In a further embodiment, reservation module 310 may be operative to store at least one hard copy 312 of at least one piece of media content 304.

Delivery module 314 may comprise a software based component, such as delivery or order fulfillment software, and the like. In yet another embodiment, delivery module 314 may comprise a hardware based component, such as an order fulfillment mechanism, including those in retailer warehouses, a courier, such as a mail or postal service, and the like. In yet another embodiment, delivery module 314 comprises a combination of software and hardware based components.

In one embodiment, offering a piece of media content 304 for sale comprises offering a digital copy 308 of a piece of media content for sale over a computer network, such as a closed computer network or an open computer network, such as the internet. The sale may be offered, solicited, or made via computing hardware, such as a personal computer, a laptop, a mobile computing device, embedded television hardware, or a set top box. In an alternate embodiment, the sale may be a temporary sale, such as a rental, or a permanent sale such as an ownership sale.

In some embodiments, offering a digital copy 308 of the piece of media content 304 for sale comprises providing a download of the piece of media content 304. Accordingly, server module 306 may be operative to provide a download of the at least one piece of media content 304. The digital copy 308 may be any type of digital copy in any type of file format, including, but not limited to, .MP4, .MP3 .MPEG, .AVI, and the like. In a further embodiment, the digital copy 308 of the media content 304 may be any type of quality or resolution, such as, but not limited to, 128 kbs, 256 kbs, 480i, 480p, 720i, 720p, 1080i, 1080p, and the like. In some embodiments, offering a digital copy 308 of the piece of media content 304 for sale comprises providing a stream or progressive download of the piece of media content 304. Accordingly, server module 306 may be operative to provide a stream or progressive download of at least one piece of media content 304. In one embodiment, the digital copy 308 may be accessed from any type of computing device, including, but not limited to, televisions, set top boxes, mobile devices, personal computers, tablet computers, laptops, and the like.

In some embodiments, the hard copy 312 of the at least one piece of content 304 comprises any type of hard copy, including, but not limited to a computer readable medium, such as a CD, a DVD, a Blu-Ray disc, solid state memory, and the like. In one embodiment, reserving a hard copy 312 comprises of storing a hard copy, such as storing a hard copy in a storage or distribution facility, which may be distributed at a later point in time. In another embodiment, reserving a hard copy 312 may comprise reserving the right to create a hard copy at a later point in time. In some embodiments, delivery module 314 may be operative to deliver hard copy 312 of the at least one piece of media content 304 upon request, wherein delivering the hard copy 312 comprises creating a hard copy of 312 the at least one piece of media content 304, if not already existing, and physically delivering the hard copy 312 of the at least one piece of media content 304. Physically delivering the hard copy 312 may comprise using any mail or courier service to deliver the hard copy 312.

In some embodiments, the request or order for delivery of the hard copy may be made by a user 316, such as a customer, or by predetermined scheduled delivery.

In some embodiments, server module 306 may be operative to deny access to the digital copy 308 of the piece of media content 304 if the hard copy 312 of the at least one piece of media content 304 has been ordered, requested or delivered. This may be accomplished through the use of digital rights management systems (DRMs), or by blocking access to the digital copy 308 of the media content 304 stored on server module 306.

In another embodiment, system 300 may further comprise a biometric identification module to verify at least one user 316's identity and authorize access to the at least one piece of media content 304 based on user 316's identity. In some embodiments, the biometric identifier may comprise of a fingerprint scanner, an iris scanner, a video sensor tied to image or facial recognition software, voice recognition software, and the like. Said biometric identification module may comprise a software component, such as biometric identification software, a hardware component, such as a biometric scanner, or a combination of both software and hardware components. In a further embodiment, biometric identification module may be connected to or in communication with server module 306. In yet another embodiment, biometric identification module may be connected to the device user 316 uses to access media content 304, 308.

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. Modifications and substitutions by one of ordinary skill in the art are considered to be within the scope of the present disclosure.

What is claimed is:

1. A method for distributing media, using at least one processor to perform any or all of the following:
    soliciting a purchase of at least one piece of media content;
    verifying the identity of at least one user using at least one biometric identifier;
    using the at least one biometric identifier to provide the at least one user with access to the at least one piece of media content;
    immediately providing a digital copy of the at least one piece of media content on a server module;
    reserving a hard copy of the at least one piece of media content for delivery to a customer upon a request made by the customer at a later point in time;
    physically delivering the hard copy of the at least one piece of media content to the customer upon the request made by the customer at the later point in time; and
    denying access to the digital copy of the at least one piece of media content on the server module if the hard copy of the at least one piece of media content has been requested or delivered, by blocking access to the digital copy of the at least one piece of media content stored on the server module.

2. The method of claim 1, wherein the at least one piece of media content is a piece of media content selected from the group consisting of: music, a movie, a television show, a documentary, and a television broadcast.

3. The method of claim 1, wherein immediately providing a digital copy of the at least one piece of media content comprises providing a download of the at least one piece of media content.

4. The method of claim 1, wherein immediately providing a digital copy of the at least one piece of media content comprises providing a stream or progressive download of the at least one piece of media content.

5. The method of claim 1, wherein reserving a hard copy of the at least one piece of media content comprises of storing a hard copy of the at least one piece of media content.

6. The method of claim 1, wherein the hard copy of the at least one piece of media content comprises a copy of the at least one piece of media content that is stored on a non-transitory computer readable medium.

7. The method of claim 1, wherein delivering the hard copy of the at least one piece of media content upon request comprises creating a hard copy of the at least one piece of media content and physically delivering the hard copy of the at least one piece of media content.

8. A method of media content distribution, using at least one processor to perform the following tasks:
   verifying the identity of at least one user using at least one biometric identifier;
   using the at least one biometric identifier to provide the at least one user with access to the at least one piece of media content;
   offering the at least one user a digital copy of the at least one piece of media content for sale;
   immediately providing a digital copy of the at least one piece of media content on a server module;
   reserving a hard copy of the at least one piece of media content when a digital copy of the at least one piece of media content is sold;
   allowing the at least one user to use a computing device to order the hard copy for physical delivery after having purchased the digital copy; and
   denying the at least one user access to the digital copy when the hard copy has been ordered, by blocking access to the digital copy of the at least one piece of media content stored on the server module.

9. The method of claim 8, wherein the digital copy may be accessed by stream or download.

10. A system comprising:
    at least one commerce module to offer at least one copy of at least one piece of media content for sale;
    at least one biometric identification module for verifying at least one user's identity, wherein said at least one biometric identification module authorizes the at least one user's access to the at least one piece of media content for sale once the at least one user's identity has been verified;
    at least one hardware server module to immediately provide access to at least one digital copy of the at least one piece of media content;
    at least one reservation module to reserve at least one hard copy of the at least one piece of media content for delivery to the customer upon a request made by a customer at a later point in time;
    at least one delivery module to effectuate the physical delivery of at least one hard copy of the at least one piece of media content to the customer upon the request made by the customer at the later point in time and;
    at least one hardware server module to deny access to the digital copy of the at least one piece of media content if the hard copy of the at least one piece of media content has been requested or delivered, by blocking access to the digital copy of the at least one piece of media content stored on the at least one hardware server module.

11. The system of claim 10, wherein the at least one piece of media content is a piece of media content selected from the group consisting essentially of: music, a movie, a television show, a documentary, and a television broadcast.

12. The system of claim 10 wherein the server module is operative to provide a download of the at least one piece of media content.

13. The system of claim 10, wherein the server module is operative to provide a stream or progressive download of the at least one piece of media content.

14. The system of claim 10, wherein the reservation module is operative to store at least one hard copy of the at least one piece of media content.

15. The system of claim 10, wherein the hard copy of the at least one piece of media content comprises a computer readable medium.

16. The system of claim 10, wherein the delivery module is operative to create a hard copy of the at least one piece of media content and physically deliver the hard copy of the at least one piece of media content.

17. The system of claim 10, further comprising a biometric identification module to verify at least one user's identity and authorize access to the at least one piece of media content based on the at least one user's identity.

* * * * *